(12) United States Patent
Bandyopadhyay et al.

(10) Patent No.: US 12,284,294 B1
(45) Date of Patent: Apr. 22, 2025

(54) AUTHENTICATION IN METAVERSE

(71) Applicant: Wells Fargo Bank, N.A., San Francisco, CA (US)

(72) Inventors: Ananya Bandyopadhyay, Jharkhand (IN); Vivek Kalyanaraman, Bangalore (IN); Vinothkumar Venkataraman, Bangalore (IN); Suranjana Sarkar, Burdwan (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 268 days.

(21) Appl. No.: 18/149,757

(22) Filed: Jan. 4, 2023

(51) Int. Cl.
| | |
|---|---|
| *H04L 9/32* | (2006.01) |
| *G06F 3/01* | (2006.01) |
| *G06F 3/16* | (2006.01) |
| *G06T 17/00* | (2006.01) |
| *G06V 20/52* | (2022.01) |

(52) U.S. Cl.
CPC ............ *H04L 9/3271* (2013.01); *G06F 3/013* (2013.01); *G06F 3/16* (2013.01); *G06T 17/00* (2013.01); *G06V 20/52* (2022.01)

(58) Field of Classification Search
CPC ............................. H04L 67/535; H04L 9/3271
See application file for complete search history.

(56) References Cited

U.S. PATENT DOCUMENTS

| | | | |
|---|---|---|---|
| 8,041,954 B2 | 10/2011 | Plesman | |
| 8,140,340 B2 | 3/2012 | Bhogal et al. | |
| 8,260,683 B2 | 9/2012 | Crussol et al. | |
| 9,342,824 B2 | 5/2016 | Rosko et al. | |
| 9,519,934 B2 | 12/2016 | Calman et al. | |
| 10,981,069 B2 | 4/2021 | Kawachiya et al. | |
| 2002/0095586 A1* | 7/2002 | Doyle | G06F 21/32 |
| | | | 713/186 |
| 2009/0307595 A1 | 12/2009 | Clark et al. | |
| 2011/0029889 A1 | 2/2011 | Karstens | |
| 2014/0359722 A1* | 12/2014 | Schultz | H04L 63/0861 |
| | | | 726/5 |
| 2017/0270492 A1 | 9/2017 | Donovan et al. | |
| 2022/0114542 A1 | 4/2022 | Choi | |
| 2022/0240062 A1 | 7/2022 | Gurayah et al. | |
| 2023/0205781 A1* | 6/2023 | Bharadwaj | G06F 16/3331 |
| | | | 707/603 |

(Continued)

FOREIGN PATENT DOCUMENTS

| | | |
|---|---|---|
| IN | 202241008399 A | 2/2022 |
| WO | WO-2023036143 A1 * | 3/2023 |

*Primary Examiner* — Kostas J Katsikis
(74) *Attorney, Agent, or Firm* — Merchant & Gould P.C.

(57) ABSTRACT

An example computer system for authenticating a user can include: one or more processors; and non-transitory computer-readable storage media encoding instructions which, when executed by the one or more processors, causes the computer system to create: an analytical engine programmed to track activities of the user outside of a metaverse and within the metaverse; a query engine programmed to generate a series of questions for the user based upon the activities of the user outside of the metaverse and within the metaverse; and an authentication engine programmed to authenticate the user based upon responses to the series of questions provided by the user.

16 Claims, 4 Drawing Sheets

(56) References Cited

U.S. PATENT DOCUMENTS

| | | | |
|---|---|---|---|
| 2023/0319373 A1* | 10/2023 | Yallen | G06T 17/00 |
| | | | 713/176 |
| 2024/0137223 A1* | 4/2024 | Wang | H04L 9/3236 |
| 2024/0143721 A1* | 5/2024 | Naik | G06T 13/40 |

* cited by examiner

AUTHENTICATION IN METAVERSE

BACKGROUND

The metaverse can be envisioned as an immersive world that is typically facilitated through the use of virtual and augmented reality devices. The metaverse can include a virtual representation of most, if not all, aspects of the physical world in which we live. Certain aspects of metaverse activities can require authentication. This can be challenging given the decentralized nature of the electronic world.

SUMMARY

Examples provided herein are directed to authentication in the metaverse.

According to one aspect, an example computer system for authenticating a user can include: one or more processors; and non-transitory computer-readable storage media encoding instructions which, when executed by the one or more processors, causes the computer system to create: an analytical engine programmed to track activities of the user outside of a metaverse and within the metaverse; a query engine programmed to generate a series of questions for the user based upon the activities of the user outside of the metaverse and within the metaverse; and an authentication engine programmed to authenticate the user based upon responses to the series of questions provided by the user.

According to another aspect, an example method for authenticating a user can include: tracking activities of the user outside of a metaverse and within the metaverse; generating a series of questions for the user based upon the activities of the user outside of the metaverse and within the metaverse; and authenticating the user based upon responses to the series of questions provided by the user.

The details of one or more techniques are set forth in the accompanying drawings and the description below. Other features, objects, and advantages of these techniques will be apparent from the description, drawings, and claims.

DETAILED DESCRIPTION

This disclosure relates to authentication in the metaverse.

It can be desirable to authenticate an individual when performing certain activities in the metaverse. Such activities can include, without limitation, financial services like banking.

For example, a user in the metaverse may need to be authenticated to allow for access to banking features, such as Automated Teller Machine (ATM) or branch visits, etc. There can be multiple security concerns associated with authentication in the metaverse. These concerns can include, without limitation, identity theft and banking under pressure (i.e., intimidation or force against a user's free will).

The concepts provided herein relate to creation of a user persona based upon the user's activities within and outside of the metaverse. The user persona is learned over time, looking at both profile information and activity information. Such activity information can include metaverse-based activities like places visited, login frequency, place of login, time of day for login, and transaction frequency. The activity information can also include banking activity, like branch visits, ATM transactions, products held, transfers and credit card transactions, etc.

The user persona can be used to conduct multi-factor authentication. In some examples, this authentication can include at least four factors.

An example first factor can include the user's authentication when accessing the metaverse. This first factor can itself involve multiple factors depending on how authentication is configured for the metaverse. For instance, the user may have to provide a user name, password, and randomly-generated PIN to access the metaverse.

An example second factor can include activities performed by the user to mitigate against copying of the user's persona. For instance, as described further below, this second factor can include questions relating to the user's activities outside of and/or within the metaverse.

An example third factor can include an analysis of the manner in which the user provides a response to mitigate against coercion. For instance, this third factor can include an analysis of the responses provided by the user to assessed whether the responses were provided under the user's own free will.

In some examples, the authentication can include multiple challenges such as: (i) a question, such as one based upon the user's activity that requires an audio response; and (ii) a visual challenge, such as requiring a gesture from the user (e.g., a pattern using the user's limbs). The user's responses are analyzed for accuracy as well as for the semantics surrounding the responses (e.g., voice tone, movement speed, and emotion).

An example fourth factor can include the calculation of a propensity score, which estimates a likelihood of a real user accessing the metaverse under free will. The propensity score can be developed based upon the accuracy and semantics associated with the responses. Access can then be granted or denied based upon the derived propensity score.

In some examples, the challenges and associated responses from the user are not stored for any length of time, as they are continuously updated based on updates to the user persona. Every new user activity can be a driver for a new challenge and associated response, enhancing the uniqueness/non-repeatability of challenges and responses.

This results in a unique user persona at each point in time, which allows for non-replication of the user persona to mitigate against identity theft. Further, the semantic analysis of challenge responses can indicate that the user is providing the correct challenge response under normal circumstances and not under pressure/abnormal situations.

There can be various advantages associated with the technologies described herein. For instance, the authentication techniques described herein can increase the security and robustness of the metaverse. The described authentication techniques therefore result in an improvement of the metaverse technology, such as by providing fraud-prevention, and therefore result in a practical application.

Figure 1:
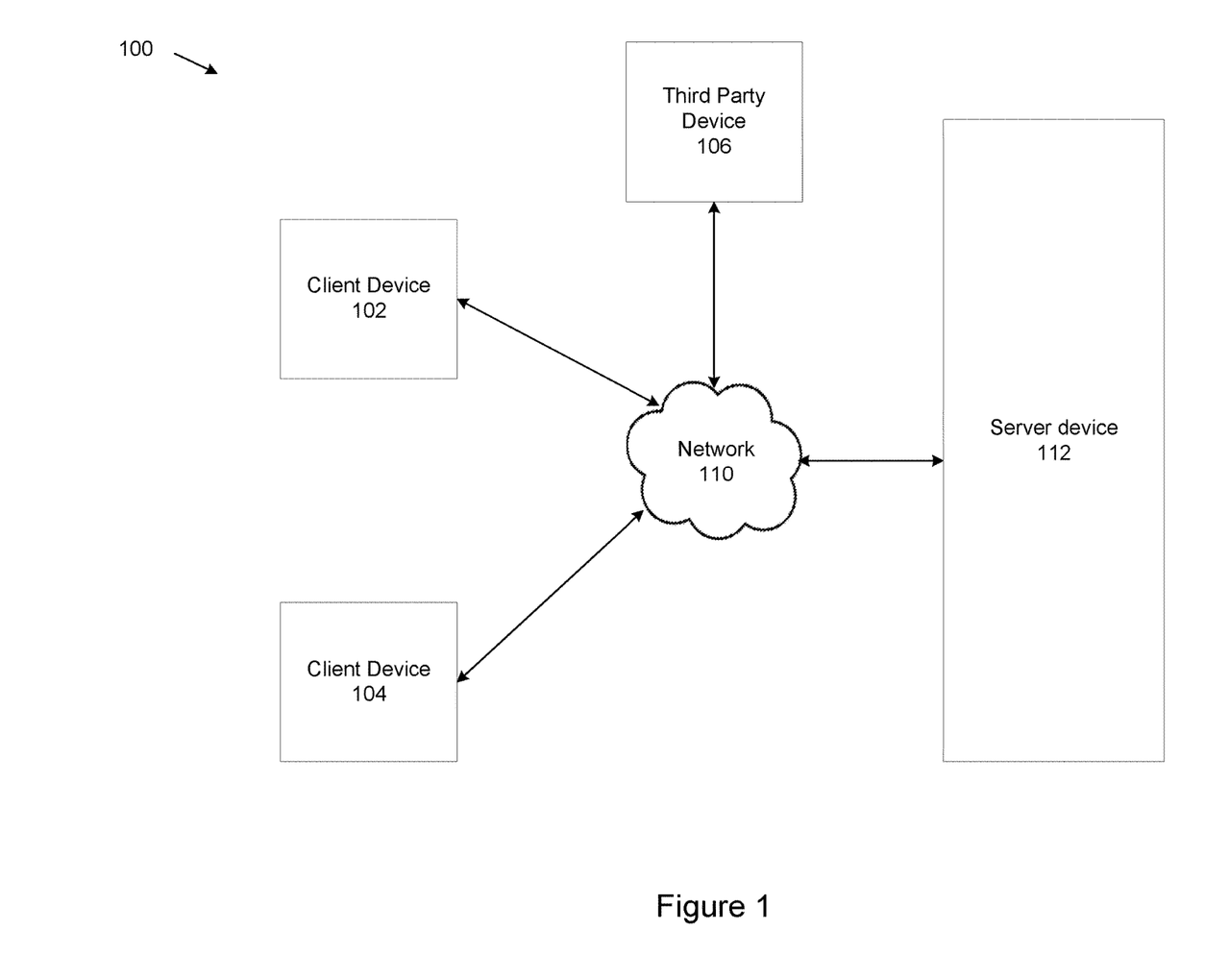
FIG. 1 shows an example system for authenticating an individual in the metaverse.

FIG. 1 schematically shows aspects of one example system 100 programmed to authenticate an individual in the metaverse. In this example, the system 100 can be a computing environment that includes a plurality of client and server devices. In this instance, the system 100 includes client devices 102, 104, a third party device 106, and a server device 112. The client devices 102, 104, the third party device 106, and the server device 112 can communicate through a network 110 to accomplish the functionality described herein.

Each of the devices may be implemented as one or more computing devices with at least one processor and memory. Example computing devices include a mobile computer, a desktop computer, a server computer, or other computing device or devices such as a server farm or cloud computing used to generate or receive data.

For instance, in some examples, the client devices 102, 104 are virtual and/or augmented reality devices that provide access to a metaverse in which individuals can interact. The metaverse can be an immersive world that is facilitated through the use of the virtual and augmented reality devices. Examples of such devices include virtual and/or augmented reality headsets that provide a three-dimensional experience associated with the metaverse, such as: Google Glass, Microsoft Halo, Meta Quest, Sony PlayStation VR, Valve Index VR, HTC Vive Pro, or HP Reverb.

In some examples, an individual can enter and interact within the metaverse using a virtual representation of themselves. This representation is referred to as an avatar, which is an icon or figure representing the individual. The avatar can be used to interact within the metaverse and can have certain preferences, settings, and options associated therewith.

The example client devices 102, 104 are programmed to access and interact within the metaverse. This interaction can include many different types of activities, such as social media interactions, gaming, and business-related activities. In the examples provided herein, the activities can also include activities related to financial services. These financial services can include, without limitation, making purchases, accessing money such as by making deposits and withdrawals from checking, saving, and/or money market accounts, loan procurements, and any other types of banking functions. Many other configurations are possible.

In this example, the third party device 106 facilitates the creation of the metaverse. For instance, the client devices 102, 104 can communicate with the third party device 106 to enter and interact in the metaverse hosted by the third party device 106.

In example embodiments, the third party device 106 can be a cloud-based platform that allows devices (e.g., client device 102, 104) to connected thereto to access the metaverse. Non-limiting examples of metaverse platforms include Decentraland from The Decentraland Foundation and Sandbox from TSB Gaming Ltd. Many other existing and future metaverses are also applicable.

In some non-limiting examples, the server device 112 is owned by a financial institution, such as a bank. The client devices 102, 104 can be programmed to communicate with the server device 112 to provide financial services within the metaverse. Examples of such financial services include, without limitation, making purchases, accessing money such as by making deposits and withdrawals from checking, saving, and/or money market accounts, and any other types of banking functions.

The example server device 112 is further programmed to provide one or more of the authentication techniques described herein. Additional details of these techniques are provided below.

The network 110 provides a wired and/or wireless connection between the client devices 102, 104, the third party device 106, and the server device 112. In some examples, the network 110 can be a local area network, a wide area network, the Internet, or a mixture thereof. Many different communication protocols can be used. Although only three devices are shown, the system 100 can accommodate hundreds of, thousands of, or more computing devices.

Figure 2:
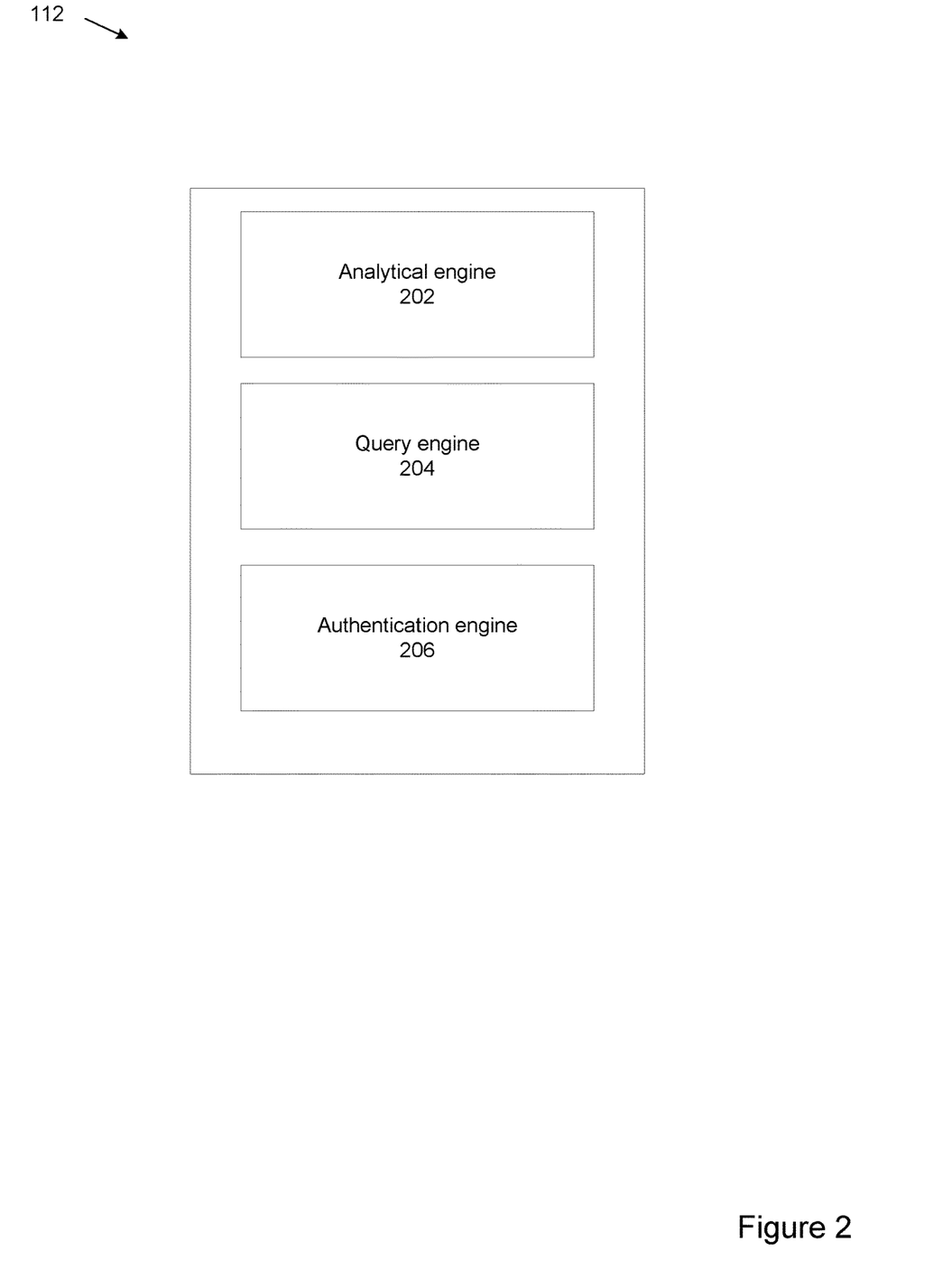
FIG. 2 shows example logical components of a service device of the system of FIG. 1.

Referring now to FIG. 2, additional details of the server device 112 are shown. In this example, the server device 112 has various logical modules that assist in authentication in the metaverse. Generally, the server device 112 is programmed to use artificial intelligence, such as machine learning, to develop the authentication techniques.

The server device 112 can, in this instance, include an analytical engine 202, a query engine 204, and an authentication engine 206 that utilize artificial intelligence. In other examples, more or fewer engines providing different functionality can be used.

The example analytical engine 202 is programmed to use machine learning techniques to develop a user persona that is unique to the user, such as being based upon multiple aspects associated with the user, like the user's profile information and activities within and outside of the metaverse. This user persona can be developed by training the artificial intelligence with information about the user. The user persona can be used for authentication of the user when the client devices 102, 104 access the server device 112 for financial services.

Examples of the profile information captured by the analytical engine 202 for the use persona includes demographic information, geographical information, physical characteristics, voice tone, and/or gesture information. Specifically, examples of the profile information include: user age; user tenure with bank; state of residence; age; height; weight; words per minute; voice tone; and/or gestures.

Examples of the activities that are captured by the analytical engine 202 include both activities within and outside of the metaverse. These activities can relate to the financial services and/or be separate from the financial services. For activities that are separate from the financial services provided by the server device 112, the server device 112 can communicate with the third party device 106, as necessary, to determine the activities.

Examples of metaverse activities include, without limitation: places visited; metaverse login frequency; place of login (home/outside); time of login (morning/day/night); metaverse transaction frequency. Examples of activities outside of the metaverse include activities associated with financial services that are provided to the user by the financial institution associated with the server device 112. These can include, without limitation: transactions; branch visits; ATM transactions (both offline and in the metaverse); products held; wires transfers; credit card transactions; digital wallet transactions; and loan re-payment information. Many other examples are possible.

The analytical engine 202 is programmed to capture these activities in near real-time as the activities occur. For instance, these activities can be updated once per minute, once per hour, and/or once per day as examples. As described further below, this allows the challenges that are used during authentication of the user to be unique and different for each interaction, thereby mitigating against fraud.

The example query engine 204 is programmed to utilize the user persona developed for the user by the analytical engine 202 to develop authentication questions for the user. This can result in a unique two-factor authentication mechanism.

In one example, the query engine 204 develops two near real-time challenges based upon the user persona: an audio question challenge and a video gesture challenge. Both challenges can utilize the developed user persona from the analytical engine 202 and incorporate the metaverse as part of the authentication mechanism.

The example audio question challenge by the query engine 204 can be based upon the user's activities as captured in the user persona by the analytical engine 202. For example, the question can be something like: "When is the last time you withdrew money at branch XXX?" This question is posed to the user on the client device 102 in audible format. Alternatively, the question can be posed through text. The user's response through the client device 102, which is also typically audible, is captured. Many other configurations are possible.

The example visual challenge by the query engine 204 can take various forms. For instance, the query engine 204 can be programmed to ask the user to perform a gesture, such as with the user's hand. Such a gesture can be based upon prior activities or simply be a requested movement. For instance, the query engine 204 can be programmed to ask the user to hold up a number of fingers representing the number of accounts held at the financial institution. The user's response through the client device 102 is captured. Many other configurations are possible.

Challenges and associated responses are not stored over time, as they are continuously updated based on updates to the user persona by the analytical engine 202. Every new user activity can be a driver for a new challenge and associated response, ensuring uniqueness/non repeatability of challenges and responses. For example, when the user conducts an ATM transaction at a branch location of the financial institution, that activity is captured by the analytical engine 202 and can be used by the query engine 204 to generate a challenge. Near real-time updates to the user persona, using current activity, can help prevent fraudulent activity based on past versions of the user persona (if compromised).

The example authentication engine 206 is programmed to use the responses from the user as captured by the query engine 204 to perform authentication. Generally, the example authentication engine 206 can be programmed to assess both accuracy and semantics associated with the responses from the user.

For example, the authentication engine 206 determines whether the responses to the audible and visual challenges are accurate. In the example above, this can include the authentication engine 206 determining that the correct date for the last time the user withdrew money is provided for the audible challenge, and the correct number of fingers is held up by the user for the visual challenge.

In addition, the authentication engine 206 can be programmed to perform a semantic analysis of the challenge responses to estimate whether the user is providing the correct challenge response under normal circumstances and not under any pressure/abnormal situations. This analysis goes beyond a determination of accuracy and attempts to determine if the responses by the user are provided under duress or coercion (as opposed to free will).

For instance, the authentication engine 206 can be programmed to compare an audible response from the user through the client device 102 to stored audible responses to assess whether the response is normal or might be provided based upon coercion. For instance, the authentication engine 206 can use artificial intelligence to learn the normal audible response tones for the user.

When an audible challenge is issued and a response is given, the authentication engine 206 can compare that response to the learned tones to determine if the response might have been given under duress. For example, the authentication engine 206 can be programmed to determine if an audible response is higher than normal or exhibits strain, which might indicate duress.

Similarly, the authentication engine 206 can be programmed to use artificial intelligence to learn mannerism of the user over time. When the user is posed with a visual challenge and provides a gesture in response, the authentication engine 206 can be programmed to analyze the response (e.g., speed of movement, etc.) to determine if the mannerisms might indicate coercion or duress.

In some examples, the authentication engine 206 can be further programmed to calculate a propensity score and compare that score to a threshold. Generally, the propensity score can indicate a likelihood of the real user accessing the metaverse on his/her own free will.

The propensity score can take into account the multiple levels of authentication that are provided by the server device 112. For instance, the propensity score can be a combination of the accuracy and semantic analysis of the two challenge questions that are posed to the user. The summation of this analysis is compared to a threshold. When the propensity score exceeds the threshold, an assumption is made that the user is real and not under duress.

For instance, the accuracy of the results of the challenge questions can each be assigned a score from 0 to 1, with 1 being the most accurate. Further, the semantic assessment for each response can also be assigned a score from 0 to 1, with 1 being the lowest likelihood of coercion. The resulting values can be added together and averaged. A score greater than a threshold, such as 0.8, could result in authentication.

If authentication fails (e.g., the accuracy or semantics associated with the responses is insufficient) and/or the propensity score falls below the threshold, authentication fails. At this point, the user is not allowed to continue the activity requested, such as conducting a transaction in the metaverse. However, in some instance, when authentication fails, the user can be presented with other options to authenticate. For example, the user can be provided with additional challenge questions or conduct an out-of-band authentication to proceed. Many configurations are possible.

Figure 3:
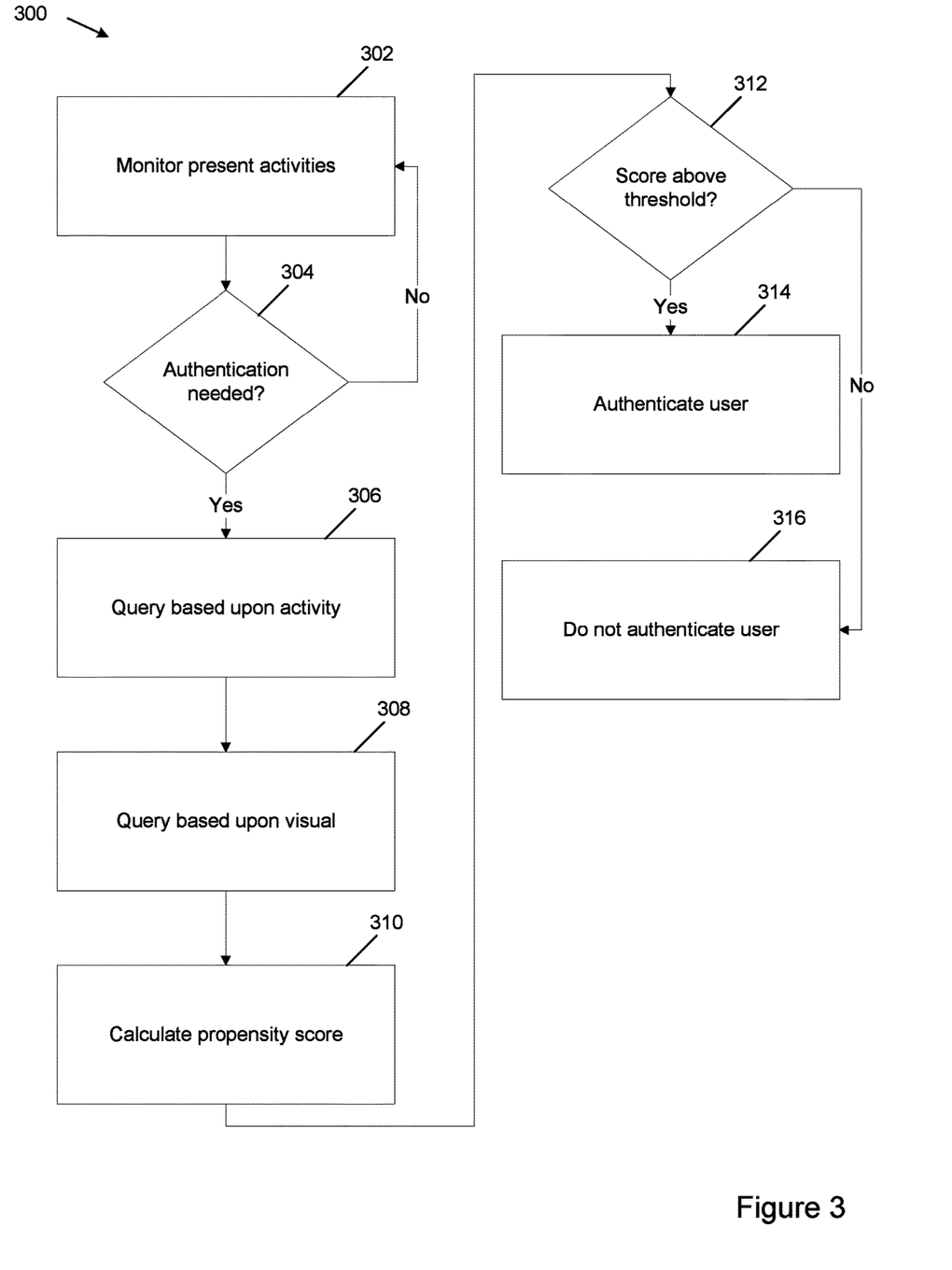
FIG. 3 shows an example method implemented by the server device of FIG. 2.

FIG. 3 shows an example method 300 for providing authentication as described herein. In some examples, the server device 112 performs the method 300.

At operation 302 of the method 300, the present activities of the user are monitored. In some examples, the activities are monitored both inside the metaverse and outside the metaverse. For instance, activities within the metaverse can be monitored, such as the last time a user has logged into the metaverse. Further, activities outside the metaverse can be monitored, such as the amount of the last transaction the user conducted at an ATM of the financial institution.

Next, at operation 304, a determination is made whether authentication is needed. If authentication is not needed, control is passed back to operation 302, and the activities of the user are continued to be monitored. As noted, this monitoring is in near real-time and is continuous, so activities are continually monitored to mitigate against staleness of the authentication information.

Alternatively, if authentication is needed, control is passed to operation 306. For instance, the user may have logged into the metaverse and is conducting a transaction with the financial institution from within the metaverse. In such a scenario, the server device 112 is programmed to perform authentication using the techniques described herein.

At operations 306 and 308, queries are provided to the user. For instance, the audible challenged can be provided in operation 306, and the visual challenge can be provided in operation 308.

Next, at operation 310, the propensity score for the user is calculated. As noted above, this propensity score can be based upon the accuracy and semantics associated with the responses from the user to the audio and visual challenges. The propensity score can then be compared to a threshold at operation 312.

If the propensity score exceeds the threshold (indicating that authentication is appropriate), control is passed to operation 314 and the user is authenticated. Upon authentication, the server device 112 can conduct the requested transaction with the user.

Alternatively, if the propensity score fails to exceed the threshold (indicating that authentication is not appropriate), control is passed to operation 316 and the user is not authenticated. In such a scenario, the user may be foreclosed from performing the requested transaction. The server device 112 may, in some instances, provide the user with alternative forms of authentication. Many other configurations are possible.

In alternative embodiments, the server device 112 can provide authentication services for other parties within the metaverse. For instance, the financial institution associated with the server device 112 can provide authentication for other businesses within the metaverse. When a user transacts with another business in the metaverse, the server device 112 can provide authentication of the user for the business before the business conducts the transaction. In this manner, the server device 112 can function as a third party authenticator for businesses and other entities within the metaverse that need authentication services. Many other configurations are possible.

Figure 4:
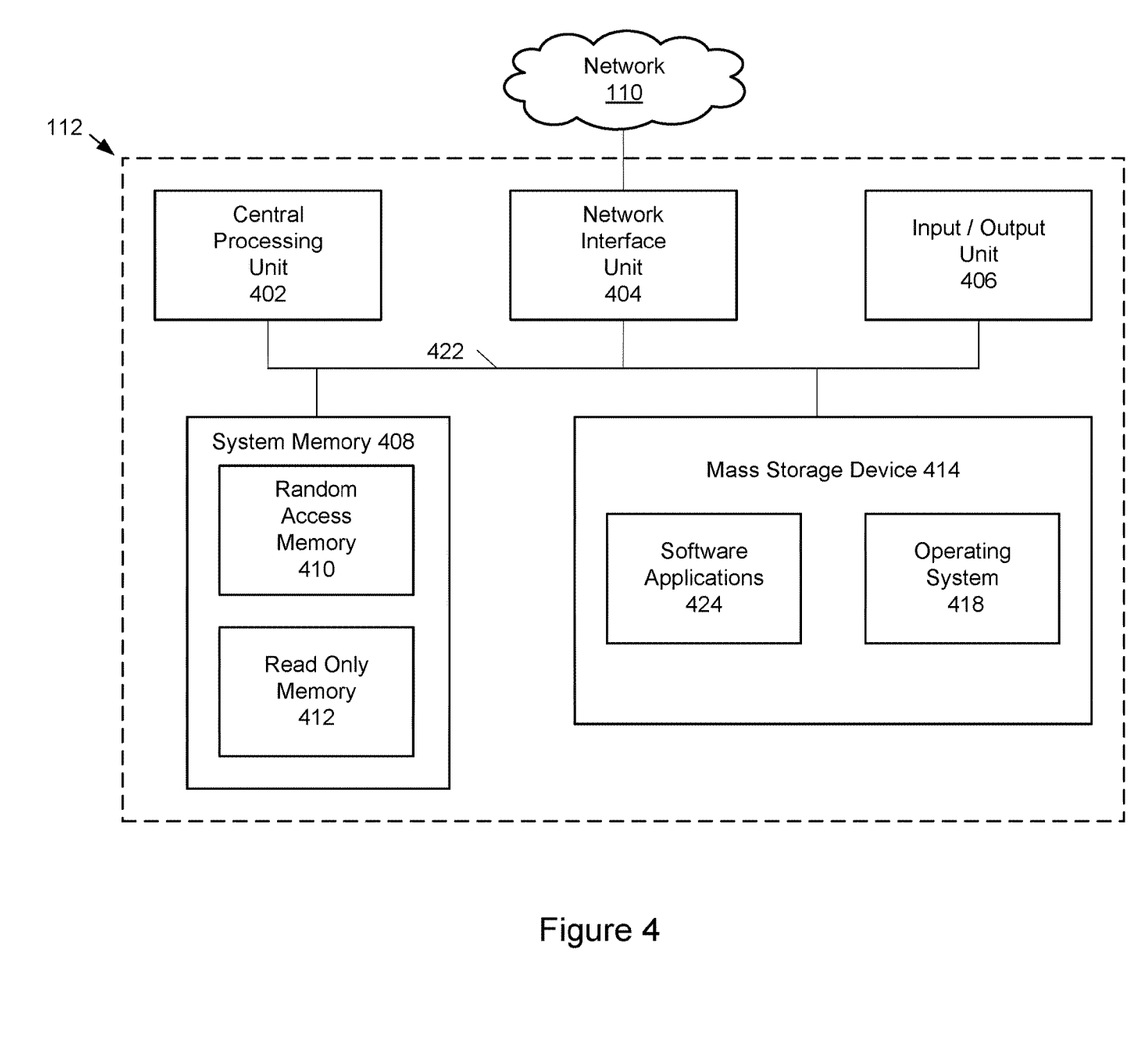
FIG. 4 shows example physical components of the server device of FIG. 2.

As illustrated in the embodiment of FIG. 4, the example server device 112, which provides the functionality described herein, can include at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system containing the basic routines that help transfer information between elements within the server device 112, such as during startup, is stored in the ROM 412. The server device 112 further includes a mass storage device 414. The mass storage device 414 can store software instructions and data. A central processing unit, system memory, and mass storage device similar to that shown can also be included in the other computing devices disclosed herein.

The mass storage device 414 is connected to the CPU 402 through a mass storage controller (not shown) connected to the system bus 422. The mass storage device 414 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 404 connected to the system bus 422. It should be appreciated that the network interface unit 404 may also be utilized to connect to other types of networks and remote computing systems. The server device 112 also includes an input/output controller 406 for receiving and processing input from a number of other devices, including a touch user interface display screen or another type of input device. Similarly, the input/output controller 406 may provide output to a touch user interface display screen or other output devices.

As mentioned briefly above, the mass storage device 414 and the RAM 410 of the server device 112 can store software instructions and data. The software instructions include an operating system 418 suitable for controlling the operation of the server device 112. The mass storage device 414 and/or the RAM 410 also store software instructions and applications 424, that when executed by the CPU 402, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for authenticating a user, comprising:
one or more processors; and
non-transitory computer-readable storage media encoding instructions which, when executed by the one or more processors, causes the computer system to create:
an analytical engine programmed to track activities of the user outside of a metaverse and within the metaverse;
a query engine programmed to generate a series of questions for the user based upon the activities of the user outside of the metaverse and within the metaverse; and
an authentication engine programmed to authenticate the user based upon responses to the series of questions provided by the user;
wherein the authentication engine is programmed to assess an accuracy and semantics associated with the responses provided by the user; and
wherein the authentication engine is programmed to calculate a propensity score based upon the responses provided by the user, wherein the propensity score measures a likelihood that the user is accessing the metaverse under free will.

2. The computer system of claim 1, wherein the analytical engine is further programmed to develop a user persona based upon the activities of the user outside of the metaverse and within the metaverse, wherein the user persona includes profile information about the user.

3. The computer system of claim 2, wherein the analytical engine further includes artificial intelligence that is programmed to learn the activities of the user outside of the metaverse and within the metaverse, wherein the activities of the user outside of the metaverse and within the metaverse are continually updated.

4. The computer system of claim 1, wherein the series of questions includes an audio question challenge and a visual question challenge.

5. The computer system of claim 4, wherein the audio question challenge includes one or more aspects of the activities of the user outside of the metaverse and within the metaverse, and the visual question challenge includes one or more gestures.

6. The computer system of claim 4, wherein the audio question challenge and the visual question challenge are continually changed over time.

7. The computer system of claim 1, wherein the user is authenticated based upon a comparison of the propensity score to a threshold.

8. The computer system of claim 1, wherein the semantics include an assessment of whether the responses are provided by the user under free will.

9. A method for authenticating a user, comprising:
tracking activities of the user outside of a metaverse and within the metaverse;
generating a series of questions for the user based upon the activities of the user outside of the metaverse and within the metaverse;
authenticating the user based upon responses to the series of questions provided by the user;
assessing an accuracy and semantics associated with the responses provided by the user; and
calculating a propensity score based upon the responses provided by the user, wherein the propensity score measures a likelihood that the user is accessing the metaverse under free will.

10. The method of claim 9, wherein the semantics include an assessment of whether the responses are provided by the user under free will.

11. The method of claim 9, further comprising authenticating the user based upon a comparison of the propensity score to a threshold.

12. The method of claim 9, further comprising developing a user persona based upon the activities of the user outside of the metaverse and within the metaverse, wherein the user persona includes profile information about the user.

13. The method of claim 12, further comprising learning the activities of the user outside of the metaverse and within the metaverse, wherein the activities of the user outside of the metaverse and within the metaverse are continually updated.

14. The method of claim 9, wherein the series of questions includes an audio question challenge and a visual question challenge.

15. The method of claim 14, wherein the audio question challenge includes one or more aspects of the activities of the user outside of the metaverse and within the metaverse, and the visual question challenge includes one or more gestures.

16. The method of claim 14, wherein the audio question challenge and the visual question challenge are continually changed over time.

* * * * *